United States Patent
Xiao et al.

(10) Patent No.: US 9,451,534 B2
(45) Date of Patent: Sep. 20, 2016

(54) CARRIER SELECTION METHOD FOR POSITIONING MEASUREMENT, POSITIONING MEASUREMENT METHOD, POSITIONING PROCESSING APPARATUS, AND TERMINAL

(71) Applicant: HUAWEI TECHNOLOGIES CO., LTD., Shenzhen (CN)

(72) Inventors: Dengkun Xiao, Beijing (CN); Jie Cui, Beijing (CN); Yuanfeng Du, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 107 days.

(21) Appl. No.: 14/097,373

(22) Filed: Dec. 5, 2013

(65) Prior Publication Data

US 2014/0092844 A1    Apr. 3, 2014

Related U.S. Application Data

(63) Continuation of application No. PCT/CN2012/076508, filed on Jun. 6, 2012.

(30) Foreign Application Priority Data

Jun. 8, 2011  (CN) .......................... 2011 1 0152002

(51) Int. Cl.
*H04W 48/16* (2009.01)
*H04W 48/18* (2009.01)
(Continued)

(52) U.S. Cl.
CPC .............. *H04W 48/16* (2013.01); *H04W 48/18* (2013.01); *H04W 64/00* (2013.01); *H04W 72/02* (2013.01)

(58) Field of Classification Search
None
See application file for complete search history.

(56) References Cited

U.S. PATENT DOCUMENTS

2010/0232362 A1    9/2010    Tenny
2010/0240396 A1*   9/2010    Zhang et al. .............. 455/456.1
(Continued)

FOREIGN PATENT DOCUMENTS

| CN | 101730222 | 6/2010 |
|---|---|---|
| CN | 101877816 | 11/2010 |
| WO | WO2010/144765 A1 | 12/2010 |
| WO | 2011/020008 A2 | 2/2011 |

OTHER PUBLICATIONS

International Search Report and Written Opinion of the International Searching Authority issued Sep. 20, 2012 in corresponding International Patent Application No. PCT/CN2012/076508.

(Continued)

*Primary Examiner* — Hong Cho
(74) *Attorney, Agent, or Firm* — Staas & Halsey LLP

(57) ABSTRACT

The present invention provides a carrier selection method for positioning measurement, which is applied to positioning measurement in a carrier aggregation scenario. The method includes: obtaining information about carriers supported by each base station participating in positioning; obtaining carriers supported by a terminal and quality information of each carrier; and selecting an optimal carrier supported by each base station from the carriers supported by the terminal, so that the terminal performs positioning measurement according to the optimal carrier. The present invention also provides a positioning measurement method, a positioning processing apparatus, and a terminal. By using the above solution, positioning measurement of terminal is implemented in a carrier aggregation scenario. Moreover, because an optimal carrier of each base station is selected for the terminal to perform positioning measurement, the accuracy of positioning measurement is improved, and thereby the accuracy of positioning is improved.

16 Claims, 3 Drawing Sheets

(51) Int. Cl.
*H04W 64/00* (2009.01)
*H04W 72/02* (2009.01)

(56) References Cited

U.S. PATENT DOCUMENTS

2010/0273506 A1 10/2010 Stern-Berkowitz et al.
2011/0207477 A1* 8/2011 Siomina et al. ........... 455/456.2
2012/0083278 A1* 4/2012 Kazmi et al. ................ 455/440

OTHER PUBLICATIONS

"3$^{rd}$ Generation Partnership Project; Technical Specification Group Radio Access Network; Evolved Universal Terrestrial Radio Access (E-UTRA); LTE Positioning Protocol (LPP); (Release 10)", 3GPP TS 36.355 V10.1.0, Mar. 2011, pp. 1-114.
"3$^{rd}$ Generation Partnership Project; Technical Specification Group Radio Access Network; Evolved Universal Terrestrial Radio Access (E-UTRA); LTE Positioning Protocol A (LPPa); (Release 10)", 3GPP TS 36.355 V10.1.0, Mar. 2011, pp. 1-52.
"LTE; Evolved Universal Terrestrial Radio Access (E-UTRA); LTE Positioning Protocol (LPP); (3GPP TS 36.355 version 9.0.0 Release 9)", ETSI TS 136 355 V9.0.0, Feb. 2010, pp. 1-103.
Chinese Search Report mailed Aug. 6, 2014, in corresponding Chinese Patent Application No. 2011101520029.
Chinese Office Action mailed Aug. 14, 2014, in corresponding Chinese Patent Application No. 201110152002.9.
International Search Report mailed Sep. 20, 2012 in corresponding International Application No. PCT/CN2012/076508.

\* cited by examiner

US 9,451,534 B2

CARRIER SELECTION METHOD FOR POSITIONING MEASUREMENT, POSITIONING MEASUREMENT METHOD, POSITIONING PROCESSING APPARATUS, AND TERMINAL

CROSS-REFERENCE TO RELATED APPLICATIONS

This application is a continuation of International Application No. PCT/CN2012/076508, filed on Jun. 6, 2012, which claims priority to Chinese Patent Application No. 201110152002.9, filed on Jun. 8, 2011, both of which are hereby incorporated by reference in their entireties.

TECHNICAL FIELD

The present invention relates to wireless communications technologies, and specifically, to a carrier selection method for positioning measurement, a positioning measurement method, a positioning processing apparatus, and a terminal.

BACKGROUND

In a Long Term Evolution (Long Term Evolution, LTE) system, the observed time difference of arrival (Observed Time Difference of Arrival, OTDOA) positioning technology is a network-assisted terminal (User Equipment, UE) positioning technology. After an enhanced serving mobile location center (Enhanced Serving Mobile Location Centre, e-SMLC) on a network side designates configurations for transmission and reception of a positioning reference signal (Positioning Reference Signal, PRS) for a base station and a terminal, the base station sends a PRS in the downlink and the terminal performs positioning measurement, that is, measures a reference signal time difference (Reference Signal Time Difference, RSTD). The e-SMLC receives time differences of signals of different base stations from the terminal, and the time difference may be mapped to distance differences between the terminal and different base stations. By using hyperbola model calculation, the e-SMLC can obtain a precise location of the terminal.

The prior art applies to a scenario where only one carrier provides service to terminals in a cell. With the development of carrier aggregation technologies, there are multiple carriers providing service to terminals in a cell. The prior art does not relate to processing of multiple carriers in a cell and therefore, in current carrier aggregation scenarios, no appropriate positioning measurement solution is available for a terminal.

SUMMARY

The present invention provides a carrier selection method for positioning measurement, a positioning measurement method, a positioning processing apparatus and a terminal to implement positioning measurement of a terminal in a carrier aggregation scenario.

A carrier selection method for positioning measurement is provided, which is applied to positioning measurement in a carrier aggregation scenario. The method includes:
obtaining information about carriers supported by each base station participating in positioning;
obtaining carriers supported by a terminal and quality information of each carrier; and
selecting an optimal carrier supported by each base station according to the quality information of each carrier, so that the terminal performs positioning measurement according to the optimal carrier.

A positioning measurement method is provided, which is applied to positioning measurement in a carrier aggregation scenario. The method includes:
obtaining, by a terminal, carriers supported by the terminal and quality information of each carrier, and sending the obtained information to a positioning server;
receiving from the positioning server an optimal carrier supported by each base station participating in positioning, where the optimal carrier is selected by the positioning server from carriers supported by the terminal according to quality information of the carriers; and
performing positioning measurement according to the optimal carrier supported by each base station.

A positioning processing apparatus is provided, including:
an obtaining module, configured to obtain information about carriers supported by each base station participating in positioning and obtain carriers supported by a terminal and quality information of each carrier; and
a carrier determining module, configured to select, according to the information about carriers supported by each base station participating in positioning, and the information about carriers supported by the terminal and the quality information of each carrier, an optimal carrier supported by each base station from the carriers supported by the terminal, so that the terminal performs positioning measurement according to the optimal carrier.

A terminal is provided, including:
an obtaining module, configured to obtain carriers supported by the terminal and the quality information of each carrier;
a transceiving module, configured to send the carriers supported by the terminal and the quality information of each carrier obtained by the obtaining module to a positioning server, and receive from the positioning server an optimal carrier supported by each base station participating in positioning, where the optimal carrier is selected by the positioning server from the carriers supported by the terminal according to the quality information of the carriers; and
a positioning measurement module, configured to perform positioning measurement according to the optimal carrier supported by each base station and received by the transceiving module.

The carrier selection method for positioning measurement, positioning measurement method, positioning processing apparatus, and terminal implement positioning measurement of a terminal in a carrier aggregation scenario. Moreover, because an optimal carrier of each base station is selected for the terminal to perform positioning measurement, the accuracy of positioning measurement is improved, and thereby the precision of positioning is improved.

DESCRIPTION OF EMBODIMENTS

To make the objectives, technical solutions, and advantages of the present invention more comprehensible, the following further describes the present invention in detail with reference to the accompanying drawings.

The present invention provides a positioning measurement method, a positioning processing apparatus, and a terminal, which are all applied to positioning measurement in a carrier aggregation scenario. Embodiments of the positioning measurement method include:

Embodiment 1 of Positioning Measurement Method

Figure 1:
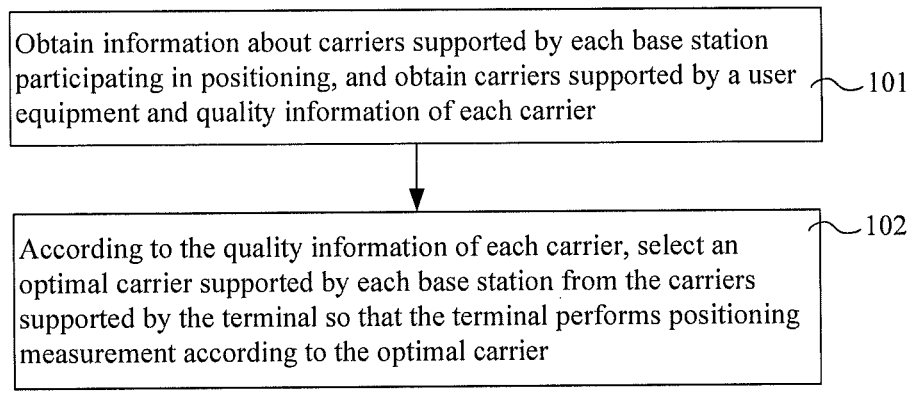
FIG. 1 is a flowchart of a method according to Embodiment 1 of the present invention.

As shown in FIG. 1, this embodiment includes the following steps:

Step 101: Obtain information about carriers supported by each base station participating in positioning, and obtain carriers supported by a terminal and quality information of each carrier.

Step 102: Select an optimal carrier supported by each base station from the carriers supported by the terminal according to the quality information of each carrier, so that the terminal performs positioning measurement according to the optimal carrier.

The foregoing steps in the embodiment may be performed by a positioning server, for example, an e-SMLC, or a terminal. By performing the foregoing steps, positioning measurement of a terminal is implemented in a carrier aggregation scenario. Moreover, because an optimal carrier of each base station is selected for the terminal to perform positioning measurement, the accuracy of positioning measurement is improved, and thereby the precision of positioning is improved.

When the foregoing steps are performed by a positioning server, the positioning server receives an OTDOA Information Response message from each base station, that is, eNB, to obtain the information about carriers supported by each base station; or receives an OTDOA Provide Capabilities message from the terminal to obtain the carriers supported by the terminal and the quality information of each carrier.

Before receiving an OTDOA Information Response message from each base station, the positioning server sends an OTDOA Information Request message to each base station. Each base station obtains, according to the request message, information about carriers supported by the base station and sends the obtained information to the positioning server by using an OTDOA Information Response message.

Before receiving an OTDOA Provide Capabilities message from the terminal, the positioning server sends an OTDOA Request Capabilities message to the terminal. The request message carries a carrier aggregation capability information element that requests the terminal to report information about carriers supported by the terminal and quality information of each carrier. Then, according to the OTDOA Request Capabilities message, a terminal that supports carrier aggregation obtains information about the carriers supported by the terminal and the quality information of each carrier. A terminal that does not support carrier aggregation directly ignores the information element and performs carrier reporting in a way in the prior art. The positioning server includes a carrier aggregation capabilities information element in the OTDOA Request Capabilities message to further ensure that a terminal supporting carrier aggregation is capable of reporting all carriers supported by the terminal and quality information of the carriers.

The OTDOA Provide Capabilities message may also include a terminal carrier aggregation capabilities information element, which includes two types of information, supported carriers and carrier quality, to carry the information about carriers supported by the terminal and the quality information of each carrier.

The carrier quality information may include: reference signal received power (RSRP) and/or reference signal received quality (RSRQ). Preferably, the carrier quality information is RSRP.

How to determine carrier quality according to RSRP or RSRQ is common knowledge and is not further described herein.

When the carrier quality includes RSRP and RSRQ, to compare the quality of two carriers, an RSRP ratio and RSRQ ratio of the two carriers may be compared. If the RSRP ratio is smaller than the RSRQ ratio, the carrier in the numerator has better quality.

When the foregoing steps in the embodiment are performed by a terminal, the terminal obtains information about carriers supported by each base station through a positioning server. For example, after each base station sends an OTDOA Information Response message according to an OTDOA Information Request message received from the positioning server, the positioning server delivers information about carriers supported by the base station carried in the OTDOA Information Response message to the terminal by sending an OTDOA Request Capabilities message.

The terminal may perform positioning measurement by using various positioning measurement methods in the prior art. For example, the terminal receives a PRS of each base station over the optimal carrier of the base station and identifies a first arrival path position of each PRS to obtain time differences of arrival of PRSs between different base stations, and then report measured RSTDs to the positioning server. After the measured result is reported to the positioning server, the positioning server may use various OTDOA processing solutions in the prior art.

Embodiment 2 of Positioning Measurement Method

This embodiment is a solution implemented on a terminal side. This solution and the solution executed by a positioning server in Embodiment 1 respectively belong to a terminal side and a server side of one implementation manner.

Figure 2:
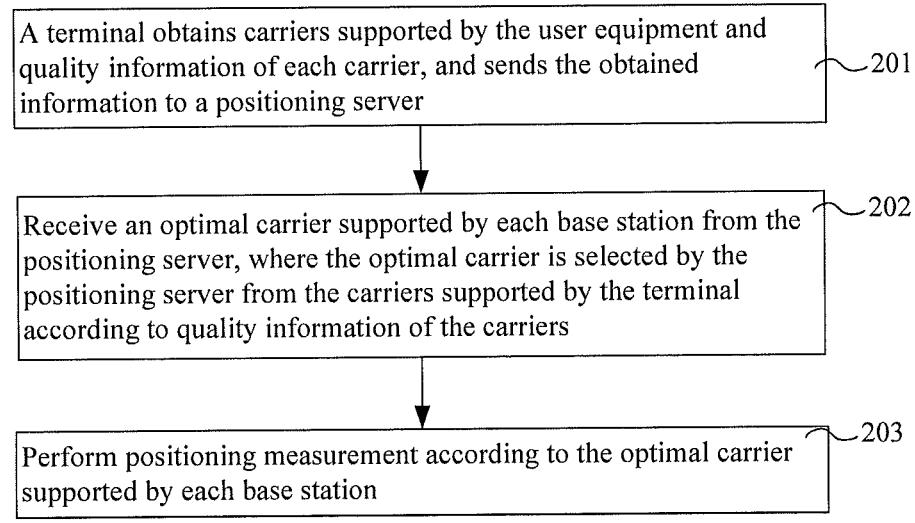
FIG. 2 is a flowchart of a method according to Embodiment 2 of the present invention.

As shown in FIG. 2, this embodiment includes the following steps:

Step 201: A terminal obtains carriers supported by the terminal and quality information of each carrier, and sends the obtained information to a positioning server.

In this step, the terminal may send the obtained carriers supported by the terminal and the quality information of each carrier to the positioning server by using a carrier aggregation capabilities information element carried in a OTDOA Provide Capabilities message.

In this embodiment, quality information of a carrier may include RSRP and/or RSRQ. Preferably, the quality information may include RSRP only.

Before step 201, the method may further include: receiving a message sent by the positioning server, where the message requests the terminal to report information about carriers supported by the terminal and quality information of each carrier. Then, in step 201, the terminal obtains the carriers supported by the terminal and the quality information of each carrier according to the message from the positioning server.

The message sent by the positioning server may be an OTDOA Request Capabilities message, where the message carries a carrier aggregation capabilities information element that requests the terminal to report carriers supported by the terminal and quality information of each carrier. Then, the terminal sends the obtained information to the positioning server by using an OTDOA Provide Capabilities message, which includes a carrier aggregation capabilities information element that carries the obtained carriers supported by the terminal and the quality information of each carrier.

Step 202: The terminal receives an optimal carrier supported by each base station participating in positioning from the positioning server. The optimal carrier is selected by the positioning server from the carriers supported by the terminal according to the quality information of the carriers.

Step 203: The terminal performs positioning measurement according to the optimal carrier supported by each base station.

By performing the foregoing steps, positioning measurement of a terminal is implemented in a carrier aggregation scenario. Moreover, because an optimal carrier of each base station is selected for the terminal to perform positioning measurement, the accuracy of positioning measurement is improved, and thereby the precision of positioning is improved.

The terminal may perform positioning measurement by using various positioning measurement methods in the prior art. After the measurement result is reported to the positioning server, the positioning server may use various OTDOA processing solutions in the prior art.

Embodiment 3 of Positioning Measurement Method

This embodiment is a preferred implementation manner in the embodiments of the present invention, and includes a complete positioning measurement procedure completed through interactions between a positioning server, a base station, and a terminal.

Figure 3:
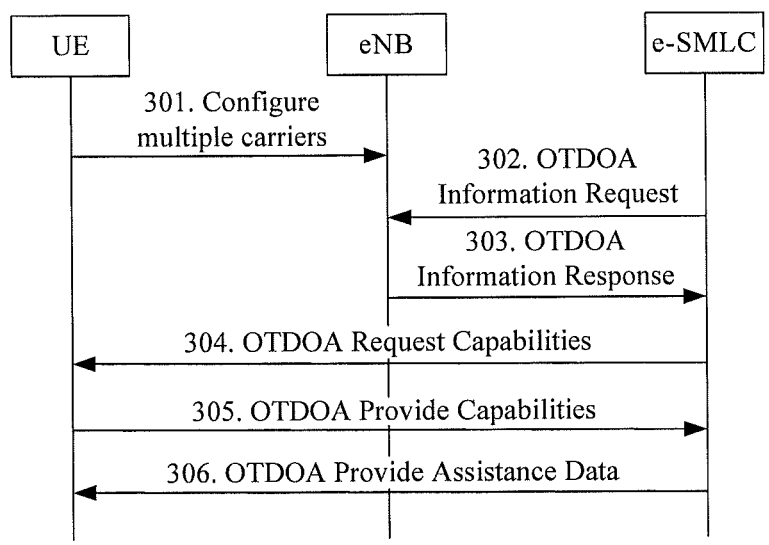
FIG. 3 is a flowchart of a method according to Embodiment 3 of the present invention.

As shown in FIG. 3, this embodiment includes the following steps:

The procedure in this embodiment is based on a RRC-connected (RRC-Connected) state of a mobile station. The RRC-connected state of the mobile station, that is, activation of the mobile station, may be implemented using various activation solutions in the prior art, which are not further described herein.

Step 301: An eNB configures multiple carriers for a UE.

This step is a common step in a carrier aggregation scenario and specific configurations may be completed by using various currently disclosed solutions.

Step 302: An e-SMLC sends an OTDOA Information Request (INFORMATION REQUEST) to each eNB participating in positioning, inquiring the eNB about information related to OTDOA positioning.

Step 303: Each eNB sends an OTDOA Information Response (INFORMATION RESPONSE) to the e-SMLC, where the response message includes information about all carriers supported by the eNB.

Step 302 and step 303 are consistent with the OTDOA positioning technology in the prior art and are not further described herein.

Step 304: The e-SMLC sends an OTDOA Request Capabilities (Request Capablities) to the UE, inquiring whether the UE supports OTDOA positioning and its OTDOA positioning capabilities. The RequestCapablities contains a new terminal carrier aggregation capabilities (UE CA capabilities) information element, which is used to request the UE to report carriers it supports and RSRP of each carrier in each cell.

The following shows a structure of an OTDOA Request Capabilities message in this step, where the terminal carrier aggregation capabilities UE CA capabilities is a new information element used to request a terminal supporting carrier aggregation to report carriers supported by the terminal and RSRP of each carrier in each cell. The cell herein can be considered as an equivalent of a base station.

OTDOA Request Capabilities

```
-- ASN1START
OTDOA-RequestLocationInformation ::= SEQUENCE {
    assistanceAvailability         BOOLEAN,
    ...
}
UE CA capabilities                 support frequencies
UE RSRP in each frequencies each cell
-- ASN1STOP
```

Step 304 and step 302 are not subject to a strict order of implementation. Step 302 may be performed before step 304, or step 304 may be performed before step 302.

Step 305: The UE sends an OTDOA Provide Capabilities (Provide Capabilities) message to the e-SMLC, where the message includes the carriers supported by the UE and the RSRP of each carrier in each cell.

The following shows a structure of an OTDOA Provide Capabilities message in this step, where the terminal carrier aggregation capabilities UE CA capabilities is a new information element used to carry carriers supported by a terminal and RSRP of each carrier in each cell that are reported by the terminal.

OTDOA-ProvideCapabilities:

```
-- ASN1START
OTDOA-ProvideCapabilities ::= SEQUENCE {
    otdoa-Mode      BIT STRING { ue-assisted (0) } (SIZE
    (1..8)),
    ...,
    supportedBandListEUTRA          SEQUENCE (SIZE
    (1..maxBands)) OF
SupportedBandEUTRA                  OPTIONAL
}
maxBands INTEGER ::= 64
SupportedBandEUTRA ::= SEQUENCE {
    bandEUTRA                       INTEGER (1..64)}
UE CA capabilities                  support frequencies
UE RSRP in each frequencies each cell
-- ASN1STOP
```

The foregoing description in this step applies to a UE that supports OTDOA and carrier aggregation. For a UE that does not support OTDOA, the OTDOA Provide Capabilities message sent to the e-SMLC includes only information that the UE does not support OTDOA. After receiving the information that the UE does not support OTDOA, the e-SMLC determines a positioning failure and the procedure ends. For a UE that does not perform step 301 and therefore does not support carrier aggregation, an OTDOA Provide Capabilities message may be directly sent in a way in the prior art.

Step 306: The e-SMLC sends an OTDOA Provide Assistance Data (Provide Assistance Data) to the UE, notifying the UE of positioning assistance information.

After receiving the OTDOA Provide Capabilities message from the UE, the e-SMLC selects a carrier of the best quality (that is, an optimal carrier) to perform positioning measurement from carriers supported by each base station for the UE, according to the information about carriers supported by the UE and RSRP of each carrier, which are carried in the message, as well as carrier information reported by each base station in the foregoing step. The positioning server also sends information about the selected optimal carrier of each base station to the UE by using an OTDOA Provide Assistance Data message.

After receiving the OTDOA Provide Assistance Data message, the UE performs positioning measurement and subsequent operations according to the carrier information included in the received message. This part of the solution may be implemented by referring to a solution in the prior art and is not further described herein.

Persons of ordinary skill in the art should understand that all or a part of the steps of the method according to the embodiments may be implemented by a program instructing relevant hardware. The program may be stored in a computer readable storage medium. When the program is executed, contents of each implementation manner of the foregoing positioning measurement method of the present invention are covered. The readable storage medium may be: a ROM/RAM, a magnetic disk, and an optical disc.

The present invention also provides embodiments of a positioning processing apparatus, a positioning server, and a terminal, which are described hereinafter.

Embodiment 1 of Positioning Processing Apparatus

Figure 4:
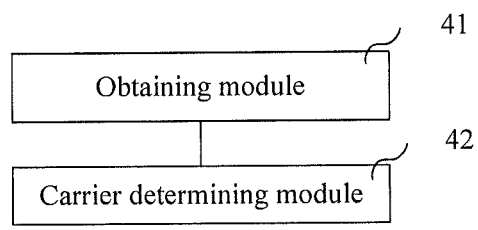
FIG. 4 is a schematic diagram of the structure of a positioning processing apparatus according to Embodiment 1 of the present invention.

As shown in FIG. 4, this embodiment includes the following modules:

an obtaining module 41, configured to obtain information about carriers supported by each base station participating in positioning, and obtain carriers supported by the terminal and quality information of each carrier; and a carrier determining module 42, configured to select an optimal carrier supported by each base station from the carriers supported by the terminal according to the information about carriers supported by each base station, the information about carriers supported by the terminal and the quality information of each carrier, which are obtained by the obtaining module 41, so that the terminal performs positioning measurement according to the selected optimal carrier.

In this embodiment, the positioning processing apparatus that includes the foregoing modules may specifically be a positioning server or a terminal. For details about the specific implementation of a corresponding device, reference may be made to related descriptions in Embodiment 1, that is, the specific implementation executed by the positioning server or terminal in the preceding method embodiment, which is not further described herein.

Embodiment 2 of Positioning Processing Apparatus

Figure 5:
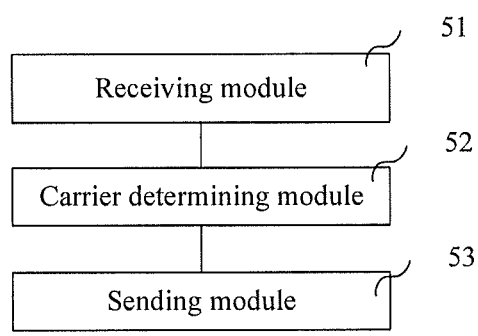
FIG. 5 is a schematic diagram of the structure of a positioning processing apparatus according to Embodiment 2 of the present invention.

As shown in FIG. 5, when the positioning processing apparatus is specifically a positioning server, the obtaining module 41 may be a receiving module 51, where the positioning server includes the receiving module 51, a carrier determining module 52 and a sending module 53.

The sending module 53 is configured to send a message to a terminal, requesting to obtain information about carriers supported by the terminal and quality information of each carrier, and deliver the optimal carrier supported by each base station, which is selected by the carrier determining module 52, to the terminal, so that the terminal performs positioning measurement according to the selected optimal carrier.

The receiving module 51 is configured to obtain information about carriers supported by each base station participating in positioning; and receive from the terminal a response message which is returned by the terminal according to the message sent by the sending module, so as to obtain the carriers supported by the terminal and the quality information of each carrier.

The carrier determining module 52 is configured to select an optimal carrier supported by each base station from the carriers supported by the terminal according to the information about carriers supported by each base station, the information about carriers supported by the terminal and quality information of each carrier, which are obtained by the receiving module 51.

The message sent to the terminal by the sending module 53 may be an OTDOA Request Capabilities message, where the message carries a carrier aggregation capabilities information element that requests the terminal to report information about carriers supported by the terminal and quality information of each carrier.

The response message received by the obtaining module 51 from the terminal may be an OTDOA Provide Capabilities message, where the message includes a carrier aggregation capabilities information element that carries the carriers supported by the terminal and the quality information of each carrier.

The quality information of a carrier may be RSRP.

For details about further implementation of this embodiment, reference may be made to description related to a positioning server in Method Embodiments 1 or 3, which is not further described herein.

Embodiment of Terminal

Figure 6:
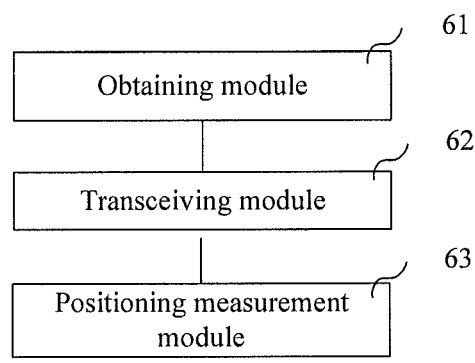
FIG. 6 is a schematic diagram of the structure of a terminal according to an embodiment of the present invention.

As shown in FIG. 6, a terminal embodiment includes the following modules:

an obtaining module 61, configured to obtain carriers supported by the terminal and quality information of each carrier;

a transceiving module 62, configured to send the carriers supported by the terminal and the quality information of each carrier obtained by the obtaining module 61 to a positioning server; and receive from the positioning server an optimal carrier supported by each base station participating in positioning, where the optimal carrier is selected by the positioning server from the carriers supported by the terminal according to quality information of the carriers; and a positioning measurement module 63, configured to perform positioning measurement according to the optimal carrier of each base station received by the transceiving module 62.

The transceiving module 62 may be further configured to receive from the positioning server a message that requests reporting of carriers supported by the terminal and quality information of each carrier. According to the message received by the transceiving module, the obtaining module 61 obtains carriers supported by the terminal and quality information of each carrier.

The message received by the transceiving module may be an OTDOA Request Capabilities message, where the message carries a carrier aggregation capabilities information element that requests the terminal to report carriers supported by the terminal and quality information of each carrier. Then, the transceiving module sends the carriers supported by the terminal and the quality information of each carrier to the positioning server by using an OTDOA Provide Capabilities message, where the message includes a carrier aggregation capabilities information element that carries the obtained carriers supported by the terminal and the quality information of each carrier.

The quality information of a carrier may be RSRP.

For details about further implementation of this embodiment, reference may be made to description related to a terminal in Method Embodiment 2 or 3, which is not further described herein.

The preceding embodiments in the present invention provide a positioning measurement solution applicable to a carrier aggregation scenario, that is, a multi-carrier scenario, which improves the precision of positioning compared with a single-carrier scenario. The following table shows a result of an emulation of OTDOA positioning measurement conducted by the inventor.

According to the emulation, by comparing a selected carrier of the best quality from multiple carriers (as described in the preceding embodiments of the present invention) with a selected fixed single carrier, the following result is obtained:

|  | 3 sites | | 4 sites | |
| --- | --- | --- | --- | --- |
|  | Single-carrier | Multi-carrier | Single-carrier | Multi-carrier |
| P (precision <= 50 m) | 64.0% | 69.2% | 90.0% | 92% |
| P (precision <= 150 m) | 74.0% | 77.4% | 96.1% | 97.8% |

Note: The US Federal Communications Commission (FCC) requires that 66% positioning should be smaller than 50 m and 95% positioning should be smaller than 150 m. By selecting an optimal carrier from multiple carriers, the rate of 50 m positioning precision is substantially increased and meets the requirement Although the present invention has been illustrated and described with reference to some exemplary embodiments, persons of ordinary skill in the art should understand that various modifications may be made to the forms and details, without departing from the spirit and scope of the present invention.

What is claimed is:

1. A carrier selection method for positioning measurement, which is applied to positioning measurement in a carrier aggregation scenario, comprising:
   obtaining information about a carrier supported by each base station participating in positioning and sending the obtained information to a positioning server;
   obtaining from a terminal a carrier supported by the terminal and quality information of each carrier; and
   selecting by the positioning server an optimal carrier supported by each base station from the carriers supported by the terminal according to the quality information of each carrier, so that the terminal performs positioning measurement according to the selected optimal carrier.

2. The method according to claim 1, wherein the carrier quality information is reference signal received power.

3. A carrier selection method for positioning measurement, which is applied to positioning measurement in a carrier aggregation scenario, comprising:
   obtaining information about a carrier supported by each base station participating in positioning;
   obtaining a carrier supported by a terminal and quality information of each carrier; and
   selecting an optimal carrier supported by each base station from the carriers supported by the terminal according to the quality information of each carrier, so that the terminal performs positioning measurement according to the selected optimal carrier, wherein: the method is executed by a positioning server; before the positioning server obtains the carriers supported by the terminal and the quality information of each carrier, the method further comprises:
   sending, by the positioning server, a message to the terminal, requesting the terminal to obtain carriers supported by the terminal and quality information of each carrier;
   obtaining, by the positioning server, the carriers supported by the terminal and the quality information of each carrier by receiving a response message returned by the terminal according to the request; and
   sending, by the positioning server, selected an optimal carrier supported by each base station to the terminal after selecting an optimal carrier supported by each base station, so that the terminal performs positioning measurement according to the selected optimal carrier.

4. The method according to claim 3, wherein the message sent to the terminal by the positioning server is an observed arrival time difference OTDOA Request Capabilities message, where the message carries a carrier aggregation capabilities information element that requests the terminal to report carriers supported by the terminal and quality information of each carrier; and
   the message returned by the terminal may be an OTDOA Provide Capabilities message, where the message comprises a carrier aggregation capabilities information element that carries the carriers supported by the terminal and the quality information of each carrier.

5. A positioning measurement method, which is applied to a carrier aggregation scenario, comprising:
   obtaining, by a terminal, carriers supported by the terminal and quality information of each carrier;
   sending, by the terminal, the obtained information to a positioning server;
   receiving, by the terminal, from the positioning server an optimal carrier supported by each base station participating in positioning; wherein the optimal carrier is selected by the positioning server from the carriers supported by the terminal according to the quality information of the carriers; and
   performing, by the terminal positioning measurement according to the received optimal carrier of each base station.

6. The method according to claim 5, wherein before the obtaining step, the method further comprises:
   receiving, by the terminal, carriers supported by the terminal and quality information of each carrier from the positioning server a message that requests the terminal to reportr; and
   obtaining, by the terminal, the carriers supported by the terminal and the quality information of each carrier according to the message from the positioning server.

7. The method according to claim 6, wherein the message sent by the positioning server is an OTDOA Request Capabilities message, where the message carries a carrier aggregation capabilities information element that requests the terminal to report carriers supported by the terminal and quality information of each carrier; and the terminal sends the obtained information to the positioning server by using an OTDOA Provide Capabilities message, wherein the message comprises a carrier aggregation capabilities information element that carries the carriers supported by the terminal and the quality information of each carrier.

8. The method according to claim 5, wherein the carrier quality information is reference signal receiving power.

9. A positioning processing apparatus, comprising:
a processor, configured to obtain information about carriers supported by each base station participating in positioning, and obtain carriers supported by a terminal and quality information of each carrier;
the processor, configured to select an optimal carrier supported by each base station from the carriers supported by the terminal according to the information about carriers supported by each base station participating in positioning, and the information obtained from the terminal about carriers supported by the terminal and quality information of each carrier, which are obtained by the processor, so that the terminal performs positioning measurement according to the selected optimal carrier.

10. The apparatus according to claim 9, wherein the carrier quality information obtain by the processor is reference signal receiving power.

11. A positioning processing apparatus, comprising:
a processor, configured to obtain information about carriers supported by each base station participating in positioning, and obtain carriers supported by a terminal and quality information of each carrier;
the processor, configured to select an optimal carrier supported by each base station from the carriers supported by the terminal according to the information about carriers supported by each base station participating in positioning, and the information about carriers supported by the terminal and quality information of each carrier, which are obtained by the obtaining module, so that the terminal performs positioning measurement according to the selected optimal carrier, wherein the positioning processing apparatus is a positioning server and further comprises:
a transmitter, configured to send a message to the terminal, requesting the terminal to obtain carriers supported by the terminal and quality information of each carrier, and send to the terminal the optimal carrier supported by each base station and selected by the processor, so that the terminal performs positioning measurement according to the selected optimal carrier;
wherein, the processor obtains the carriers supported by the terminal and the quality information of each carrier by receiving from the terminal a response message returned by the terminal according to the message.

12. The apparatus according to claim 11, wherein: the message sent by the transmitter is an OTDOA Request Capabilities message, where the message carries a carrier aggregation capabilities information element that requests the terminal to report carriers supported by the terminal and quality information of each carrier; and the response message received by the processor from the terminal is an OTDOA Provide Capabilities message, where the message comprises a carrier aggregation capabilities information element that carries the carriers supported by the terminal and the quality information of each carrier.

13. A terminal, comprising:
an processor configured to obtain carriers supported by the terminal and quality information of each carrier;
a transmitter, configured to send the carriers supported by the terminal and the quality information of each carrier obtained by the processor to a positioning server, and receive from the positioning server an optimal carrier supported by each base station participating in positioning, wherein the optimal carrier is selected by the positioning server from the carriers supported by the terminal according to the quality information of the carriers; and
the processor, configured to perform positioning measurement according to the optimal carrier supported by each base station received from the transmitter.

14. The terminal according to claim 13, wherein the transceiving module is further configured to receive from the positioning server a message requesting the terminal to report carriers supported by the terminal and quality information of each carrier; and the processor is specifically configure to obtain the carriers supported by the terminal and the quality information of each carrier according to the message received by the transmitter.

15. The terminal according to claim 14, wherein the message received by the transmitter is an OTDOA Request Capabilities message, where the message carries a carrier aggregation capabilities information element that requests the terminal to report carriers supported by the terminal and quality information of each carrier; and the transmitter sends the carriers supported by the terminal and the quality information of each carrier to the positioning server by using an OTDOA Provide Capabilities message, where the message comprises a carrier aggregation capabilities information element that carries the carriers supported by the terminal and the quality information of each carrier.

16. The terminal according to claim 13, wherein the carrier quality information is reference signal receiving power.

* * * * *